United States Patent [19]
Landry et al.

[11] Patent Number: 5,835,970
[45] Date of Patent: Nov. 10, 1998

[54] BURST ADDRESS GENERATOR HAVING TWO MODES OF OPERATION EMPLOYING A LINEAR/NONLINEAR COUNTER USING DECODED ADDRESSES

[75] Inventors: Greg J. Landry; Shailesh Shah, both of San Jose, Calif.

[73] Assignee: Cypress Semiconductor Corp., San Jose, Calif.

[21] Appl. No.: 576,505

[22] Filed: Dec. 21, 1995

[51] Int. Cl.$^6$ .................................................. G06F 13/28
[52] U.S. Cl. .......................... 711/218; 711/219; 365/240
[58] Field of Search ...................... 395/421.08, 421.09; 365/240, 233.5, 238.5; 377/55; 711/218, 219

[56] References Cited

U.S. PATENT DOCUMENTS

| | | | |
|---|---|---|---|
| 4,195,340 | 3/1980 | Joyce | 364/200 |
| 4,245,307 | 1/1981 | Kapeghian et al. | 364/200 |
| 4,247,920 | 1/1981 | Springer et al. | 365/230 |
| 4,429,375 | 1/1984 | Kobayashi et al. | 365/240 |
| 4,476,527 | 10/1984 | Clayton, IV | 364/200 |
| 4,494,190 | 1/1985 | Peters | 364/200 |
| 4,523,274 | 6/1985 | Fukunaga et al. | 395/325 |
| 4,571,674 | 2/1986 | Hartung | 364/200 |
| 4,633,434 | 12/1986 | Scheuneman | 364/900 |
| 4,633,437 | 12/1986 | Mothersole et al. | 395/250 |
| 4,638,187 | 1/1987 | Boler et al. | 307/451 |
| 4,675,808 | 6/1987 | Grinn et al. | 364/200 |
| 4,683,534 | 7/1987 | Tietjen et al. | 364/200 |
| 4,736,123 | 4/1988 | Miyazawa et al. | 307/443 |
| 4,751,671 | 6/1988 | Babetski et al. | 395/250 |
| 4,791,323 | 12/1988 | Austin | 307/475 |
| 4,814,980 | 3/1989 | Peterson et al. | 395/200 |
| 4,847,809 | 7/1989 | Suzuki | 365/189.04 |
| 4,849,937 | 7/1989 | Yoshimoto | 365/189.05 |

(List continued on next page.)

FOREIGN PATENT DOCUMENTS 3132115  6/1991  Japan .
567964  3/1993  Japan .

OTHER PUBLICATIONS

IBM Technical Disclosure Bulletin, vol. 31, No. 9, "Programmable Memory Controller", Feb. 1989, pp. 351–354.

Brian Case, "MBus Provides Processor–Independent Bus", Microprocessor Report, Aug. 7, 1991, pp. 8–12.

Micron Semiconductor, Inc., *MT58LC64K18B2 64Kx18 Synchronous Sram*, Revised Apr. 9, 1993, pp. 1–12.

Paradigm, *PDM44018.64K x 18 Fast CMOS Synchronous Static SRAM with Burst Counter*, pp. 6–21–6–29.

Hitachi Semiconductor, *HM67B1864 Series (Target Spec.) 64K x 18 Bits Synchronous Fast Static RAM with Burst Counter and Self–Timed Write*, Mar. 31, 1994, Prod. Preview, 10 pgs. total.

Motorola Semiconductor Technical Data, *Product Review MCM67B618 64K x 18 Bit BurstRAM Synchronous Fast Static RAM With Burst counter and Self–Timed Write*, Rev. Mar. 1, 1993, pp. 1–9.

Cypress Semiconductor, *Preliminary CY7C1031 CY7C1032 64K x 18 Synchronous Cache RAM*, Jan. 1993–Revised May 1993, pp. 1–13.

*Primary Examiner*—Tod R. Swann
*Assistant Examiner*—Christopher S Chow
*Attorney, Agent, or Firm*—Blakely Sokoloff Taylor & Zafman LLP

[57] ABSTRACT

An improved burst address generator that is coupled to a memory array receives as its inputs a N-bit start address and dynamically generates a burst sequence of $2^N$ decoded addresses. The burst address generator is responsive to a mode-select signal that determines whether the burst address generator operates in a linear mode or a non-linear mode. A decoder is provided for decoding the start address. A wrap-around up-down $2^N$-bit shift register, coupled to the address decoder, receives the decoded start address from the address decoder and dynamically provides the proper burst address sequences in accordance to the selected mode. A start address storage element is also coupled to the shift register and the address decoder to keep track of the start address.

21 Claims, 8 Drawing Sheets

U.S. PATENT DOCUMENTS

| | | | |
|---|---|---|---|
| 4,853,846 | 8/1989 | Johnson et al. | 395/325 |
| 4,857,763 | 8/1989 | Sakurai et al. | 307/443 |
| 4,877,978 | 10/1989 | Platt | 307/473 |
| 4,893,281 | 1/1990 | Hashimoto | 365/230.06 |
| 4,903,217 | 2/1990 | Gupta et al. | 364/521 |
| 4,924,375 | 5/1990 | Fung et al. | 364/243 |
| 4,935,894 | 6/1990 | Ternes et al. | 364/900 |
| 4,954,951 | 9/1990 | Hyatt | 364/200 |
| 4,978,905 | 12/1990 | Hoff et al. | 323/314 |
| 4,979,166 | 12/1990 | Yamada | 370/538 |
| 4,991,110 | 2/1991 | Hannah | 364/518 |
| 5,056,041 | 10/1991 | Guttag et al. | 364/518 |
| 5,057,715 | 10/1991 | Larsen et al. | 307/451 |
| 5,077,686 | 12/1991 | Rubenstein | 395/550 |
| 5,079,693 | 1/1992 | Miller | 395/250 |
| 5,097,437 | 3/1992 | Larson | 395/775 |
| 5,115,503 | 5/1992 | Durkin | 395/550 |
| 5,121,354 | 6/1992 | Mandalia | 365/189.02 |
| 5,131,083 | 7/1992 | Crawford et al. | 395/275 |
| 5,136,182 | 8/1992 | Fawal | 307/296.8 |
| 5,157,284 | 10/1992 | O'Connell et al. | 307/463 |
| 5,208,838 | 5/1993 | Wendell et al. | 375/106 |
| 5,256,994 | 10/1993 | Langendorf | 331/16 |
| 5,305,282 | 4/1994 | Choi | 365/230.08 |
| 5,333,294 | 7/1994 | Schnell | 395/425 |
| 5,386,153 | 1/1995 | Voss et al. | 326/34 |
| 5,453,957 | 9/1995 | Norris et al. | 365/230.04 |
| 5,469,558 | 11/1995 | Lieberman et al. | 395/285 |
| 5,481,581 | 1/1996 | Jonas, Jr. | 377/55 |
| 5,493,530 | 2/1996 | Lee et al. | 365/189.05 |
| 5,526,320 | 6/1996 | Zagar et al. | 365/233.5 |
| 5,552,723 | 9/1996 | Shigehara et al. | 326/86 |
| 5,587,964 | 12/1996 | Rosich et al. | 365/238.5 |
| 5,625,302 | 4/1997 | Covino et al. | 326/93 |
| 5,696,917 | 12/1997 | Mills | 395/855 |
| 5,708,688 | 1/1998 | Ting | 377/33 |
| 5,715,476 | 2/1998 | Kundu | 395/855 |
| 5,721,859 | 2/1998 | Manning | 365/189.05 |

$t_{edv} = t_{counter} + t_{decoder} + t_{memory} + t_{sa} + t_{out}$

BURST ADDRESS GENERATOR HAVING TWO MODES OF OPERATION EMPLOYING A LINEAR/NONLINEAR COUNTER USING DECODED ADDRESSES

BACKGROUND OF THE INVENTION

1. Field of the Invention

This invention relates generally to high-speed memories, and more particularly to synchronous cache memories supporting burst cycles.

2. Art Background

Synchronous cache memories are commonly made with burst counters which are used to increment addresses for burst cycles. In a burst mode a processor provides a start address and the burst counter automatically generates a series of subsequent addresses. In a linear mode, which is used by some processors, (e.g., IBM/Motorola processors), the burst counter always counts up. In a non-linear mode, used by other processors, (e.g., Intel processors), the burst counter either counts up or down depending on the start address.

The burst counter is generally integrated into a high-speech memory chip (e.g. SRAM). As noted above, the burst counter enables a processor to retrieve sequences of data by providing only the starting address to the cache memory. Also, as previously noted, the address increment is either linear or non-linear depending on the processor. Table I illustrates both the linear and non-linear burst mode sequences for a two-bit burst counter having address bits A[1:0].

TABLE I

Linear and Non-Linear Burst Mode Sequences

|  | Linear Mode | | | | Non-Linear Mode | | | |
|---|---|---|---|---|---|---|---|---|
| Initial Address | 00 | 01 | 10 | 11 | 00 | 01 | 10 | 11 |
| Second Address | 01 | 10 | 11 | 00 | 01 | 00 | 11 | 10 |
| Third Address | 10 | 11 | 00 | 01 | 10 | 11 | 00 | 01 |
| Fourth Address | 11 | 00 | 01 | 10 | 11 | 10 | 01 | 00 |

FIG. 1 illustrates a block diagram of a prior art high-speed integrated memory chip. The cache memory of the prior art includes a counter and register block 3 having a first input for receiving a clock signal and a second input for receiving a start address. The counter and register block 3 includes a register and a counter. There is a propagation delay, denoted $T_{counter}$, through the counter and register block 3. The register stores the start address. The counter takes a clock signal and the start address as inputs and increments/decrements the address at every clock cycle. A decoder 7 is coupled to the counter and register block 3 for decoding the address stored in the register. The time delay through decoder 7 is denoted as $T_{decoder}$. A memory array 9 is coupled to decoder 7. The memory array 9 includes an array of memory cells, each storing a bit of information. There is a time delay from the time the memory array 9 receives signals indicating the row and column of the memory cell to be accessed and the time when the contents of the memory cell is presented to the next stage. Block 11 represents optional decoder stages that may be employed to further decode the address. A sense amplifier 13 is coupled to the memory array 9 for amplifying the output from the memory array 9. The time delay for this sense amplifier 13 is denoted $T_{SA}$. An output stage 15 is coupled to the sense amplifier 13 for outputting data that is usable to the computer system to a bus (e.g. a processor bus). The time delay associated with the output stage 15 is denoted $T_{out}$.

The total time delay which results from the use of a prior art high speed integrated memory chip denoted $T_{cdv}$ is the sum of $T_{counter}+T_{decoder}+T_{memory}+T_{SA}+T_{out}$. The $T_{cdv}$ access time specification is well known in the art and is a common specification by which performance of a cache memory is judged. In synchronous cache memories, $T_{cdv}$ is the time measured from a clock signal that initiates the data access to the time valid data is presented back to the computer system. As noted previously, $T_{cdv}$ includes a sum of a number of different delays through the various functional blocks of the cache memory. One disadvantage of this prior art system is that the decoder is in the "speed" path. In other words, $T_{decoder}$ is a portion of $T_{cdv}$. Typically, this propagation delay through the decoder 7 ranges from 0.5 ns to 1 ns.

FIG. 2 illustrates a prior art burst counter. This prior art burst counter includes a two-bit wrap around counter for receiving the address signals (i.e., A1 and A0). The output of the two-bit wrap around counter is coupled to two exclusive XOR gates. The outputs of the XOR gates are coupled to a decoder that decodes the address (A1 and A0). The decoder asserts one of the outputs (i.e., one of the DA[3:0] signals). For this case, $T_{counter}=T_A+T_B$ (FIG. 2).

FIG. 3 illustrates an alternate prior art burst counter that moves the XOR gates out of the speed path and places them before the two-bit wrap around counter. As is illustrated in FIG. 3, the XOR gates are placed before the two-bit wrap around counter. This approach is implemented in Cypress SRAM part numbers CY7B173 and CY7B174. The burst counter of FIG. 3 includes a decoder stage after the two-bit wrap around counter for generating/asserting one of the four outputs (D[3:0]). Although this approach is better than the first prior art approach in that $T_{cdv}$ is reduced (i.e., the delay due to the XOR gates is eliminated from the $T_{cdv}$ path from CLK to DA[3:0]), it is not an optimal approach. For this case, $T_{counter}=T_A$.

Accordingly, it would be desirable to optimize $T_{cdv}$ by taking the decoder out of the "speed path" and to increase the chip's performance while maintaining:

1) switchable linear/non-linear burst modes, and 2) the equivalent functionality provided by the prior art.

SUMMARY OF THE INVENTION

An improved burst counter coupled to a memory array that operates either in a linear or a non-linear mode is disclosed. The burst address generator of the present invention receives a n-bit encoded address and dynamically generates $2^N$ decoded addresses, where $2^N$ includes start address and $2^N-1$ subsequent addresses.

The present invention employs an address decoder for receiving the start address and for decoding the start address into a decoded address. The present invention also employs a storage element that is coupled to the address decoder for receiving the decoded address and for dynamically generating the $2^N$ addresses in a burst sequence in accordance with the selected mode of operation. The storage element has a mode-select input port for receiving a signal that determines the mode of operation of the burst address generator.

In an exemplary embodiment, the storage element includes a wrap around, up-down, $2^N$-bit shift register that provides the proper burst sequence of addresses.

The wrap around up-down $2^N$-bit shift register has a plurality (e.g., $2^N$) of input ports for receiving the decoded address and also has a plurality ($2^N$) of output ports. The shift register provides one of $2^N$ column or row enable lines. The shift register also includes a hold port for receiving a hold signal, that indicates that the computer system is ready for the next address (when hold is inactive), and also a load port for receiving a load signal that indicates that the current address is to be loaded into the shift register. The shift register is a synchronous part and also includes a clock port for receiving a clock signal provided by the computer system. This shift register also includes a shift direction port for receiving a signal that indicates the direction to shift the contents of the shift register.

The burst address generator further includes a shift direction signal generator that generates a signal, which selectively shifts the shift register up or down. This shift direction signal generator includes a first input port for receiving a first signal that indicates the specific burst sequence mode (i.e., non-linear or linear) and a second input port for receiving a bit or bits from the start address.

The burst address generator also includes a start address storage circuit that is coupled to the address decoder and the shift register. The start address storage circuit stores the start address provided by the processor of the computer system. By decoding the addresses prior to the counting function (i.e., passing decoded address to the shift register), the $T_{cdv}$ (i.e., clock to output time) is improved. The present invention utilizes the set-up time for the shift register to decode the addresses. In so doing, the present invention decreases the amount of time necessary for data presented by the shift register to the next stage. This next stage may be a further decoder stage or the memory array. Since all these incremental time delays through each stage of the memory element contribute to the propagation delay of the part, by reducing the delay through the register stage (i.e., the shift register), the total $T_{cdv}$ is improved.

BRIEF DESCRIPTION OF DRAWINGS

The present invention is illustrated by way of example, and not limitation in the figures of the accompanying drawings in which like references indicate similar elements.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances, well known electrical structures and circuits are shown in block diagram form in order not to unnecessarily obscure aspects of the present invention.

Figure 1:
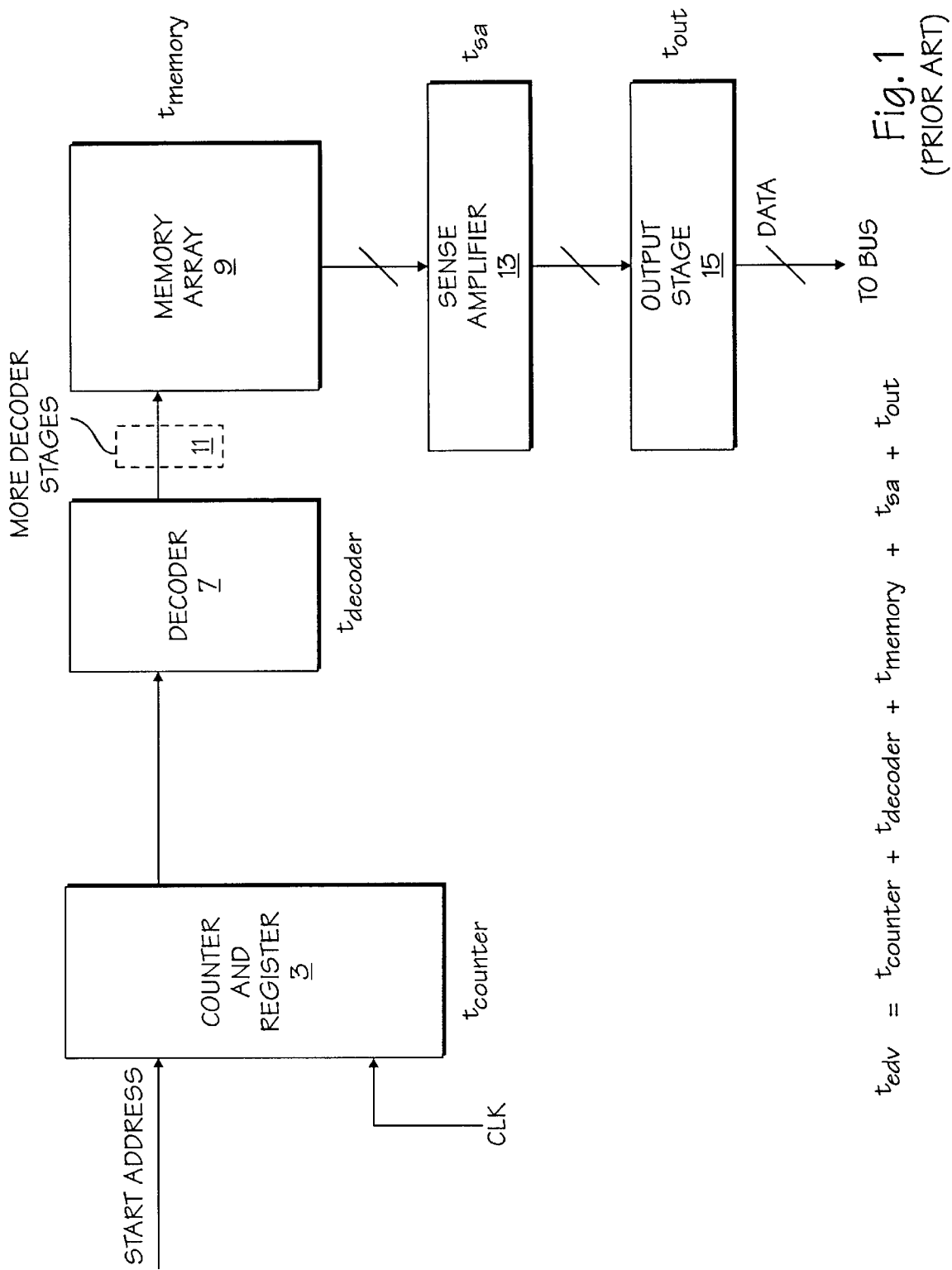
FIG. 1 illustrates a general block diagram of the prior art architecture for burst address generators.
Figure 2:
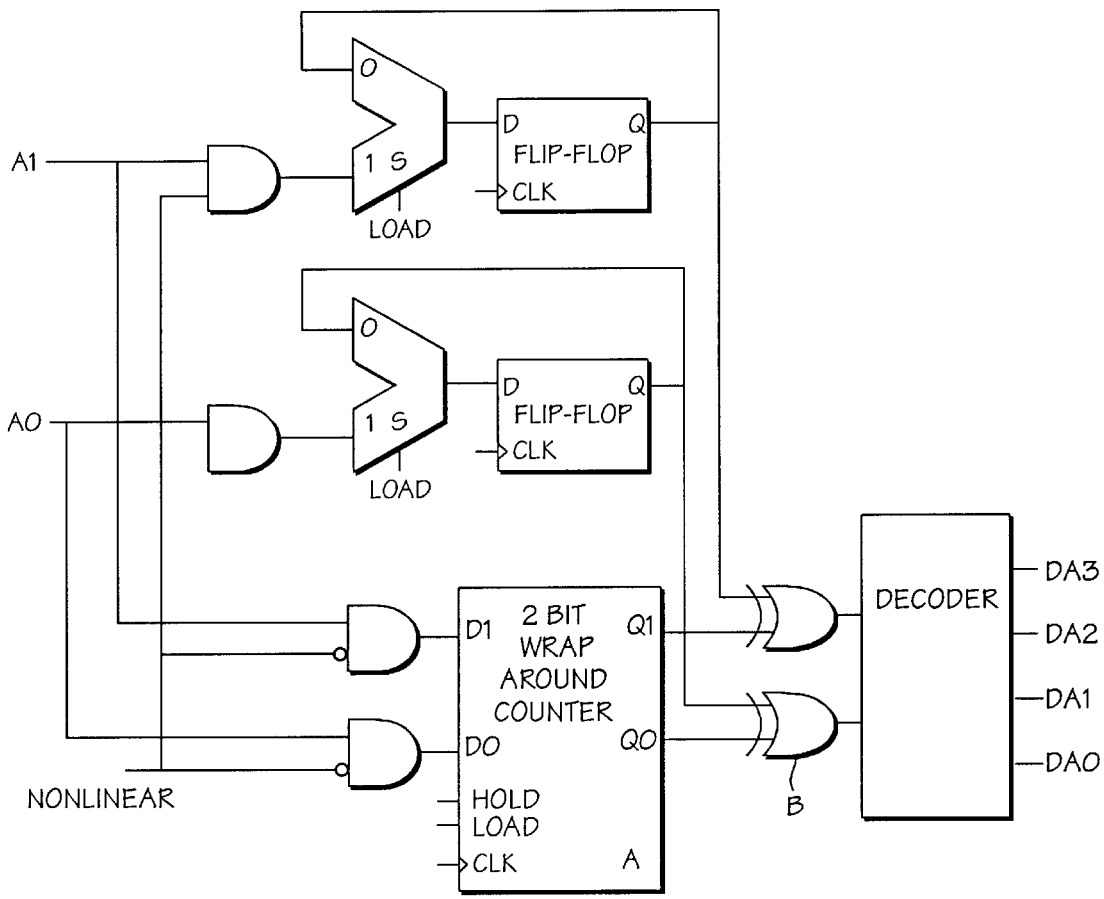
FIG. 2 illustrates a prior art burst address generator.
Figure 3:
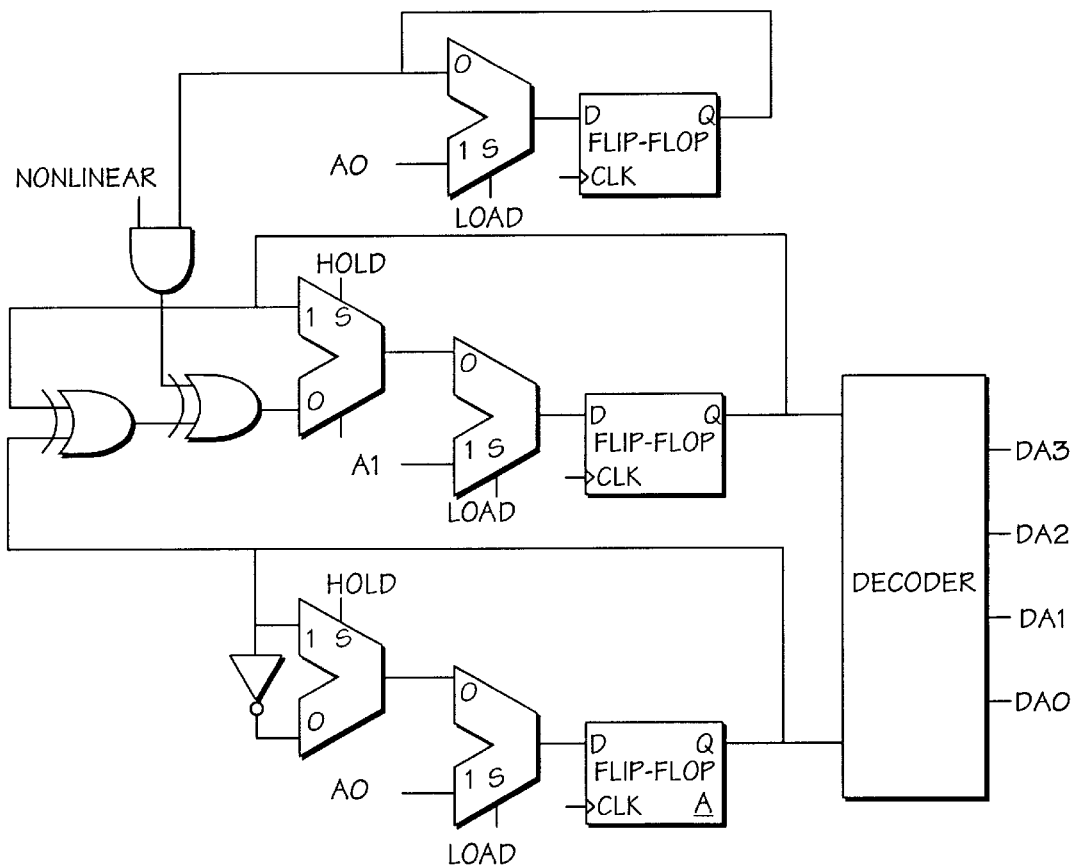
FIG. 3 illustrates an alternative prior art burst address generator.
Figure 4:
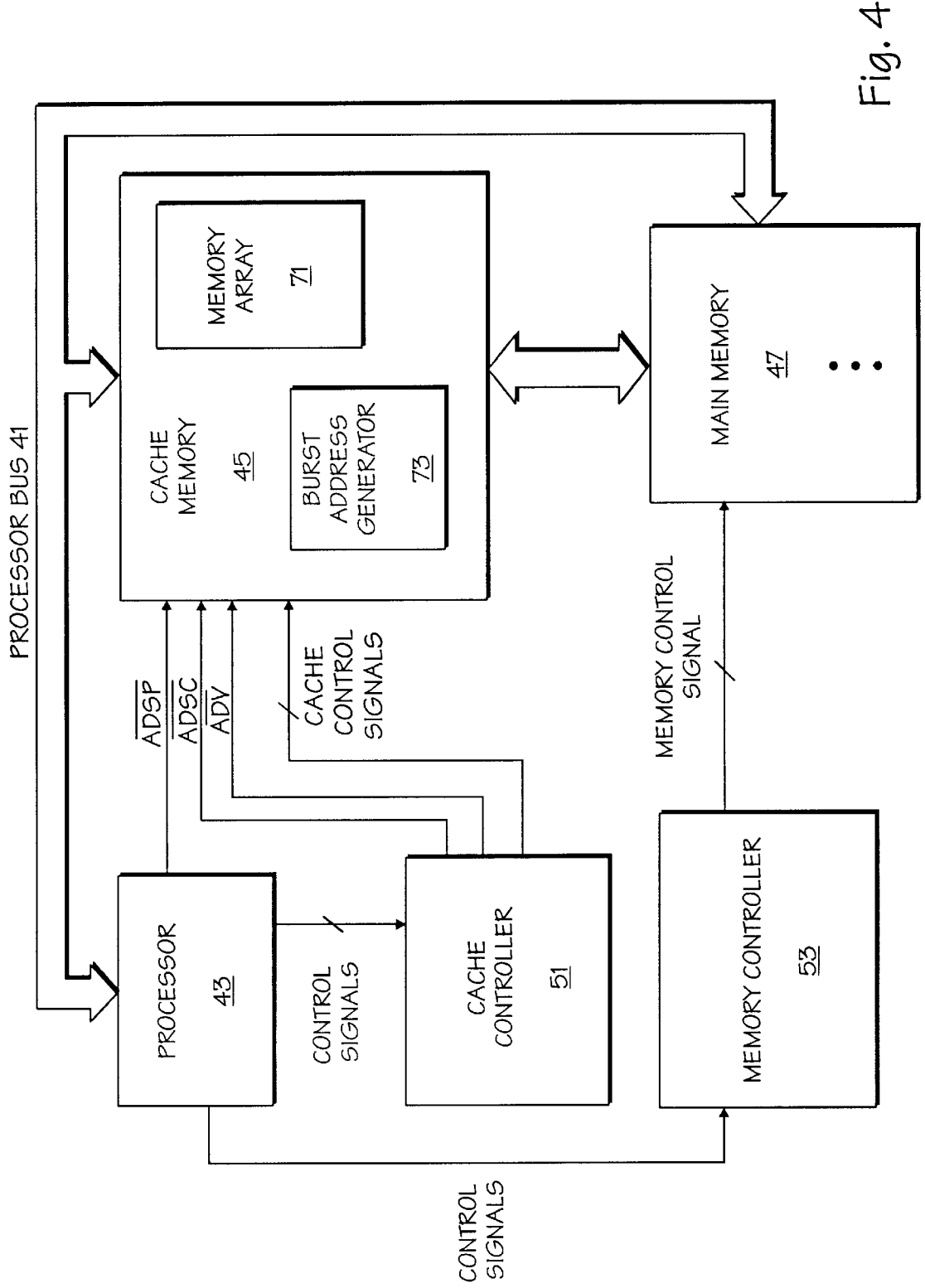
FIG. 4 illustrates a computer system in which the present invention may be implemented.

FIG. 4 illustrates the computer system in which the present invention may be implemented. This computer system includes a processor bus 41 for coupling the processor 43 to a cache memory 45 and a main memory 47. The cache memory 45 is typically implemented using a static random access memory (i.e., SRAM), and the main memory 47 is implemented using dynamic random access memory (i.e., DRAM). This computer system also includes a cache controller 51 for controlling access to the cache memory 45, and a memory controller 53 for controlling access to the main memory 47. The processor 43 is coupled to the memory controller 53 via memory controller control signals, and the processor 43 is coupled to the cache controller 51 via cache controller control signals. Similarly, cache controller 51 is coupled to the cache memory 45 via a plurality of cache control signals. Similarly, the memory controller 53 is coupled to main memory 57 via a plurality of memory control signals.

The following three signals are particularly relevant in a discussion of the present invention. First, processor 43 sends a $\overline{\text{ADSP}}$ signal to the cache memory 45. The processor address strobe ($\overline{\text{ADSP}}$) signal indicates to the cache memory 45 that the current address on the processor bus 41 may be loaded into the burst address generator 73. A second signal, the $\overline{\text{ADSC}}$ (i.e., the cache controller address strobe signal) is generated by the cache controller 51 and sent to the cache memory 45. The $\overline{\text{ADSC}}$ signal indicates to the cache memory 45 that the current address on the processor bus 41 may be loaded into the burst address generator 73. The last signal is the $\overline{\text{ADV}}$ signal (the burst address advance signal). The $\overline{\text{ADV}}$ signal is generated by the cache controller 51 and provided to the cache memory 45. The $\overline{\text{ADV}}$ signal indicates to the cache memory 45 that the computer system is ready for the next address. The $\overline{\text{ADV}}$ signal essentially is asserted by a pseudo-wait state generator in the cache controller 51.

Cache memory 45 also includes a memory array 71 and a burst address generator 73. Both of these blocks will be described in detail hereinafter.

Figure 5:
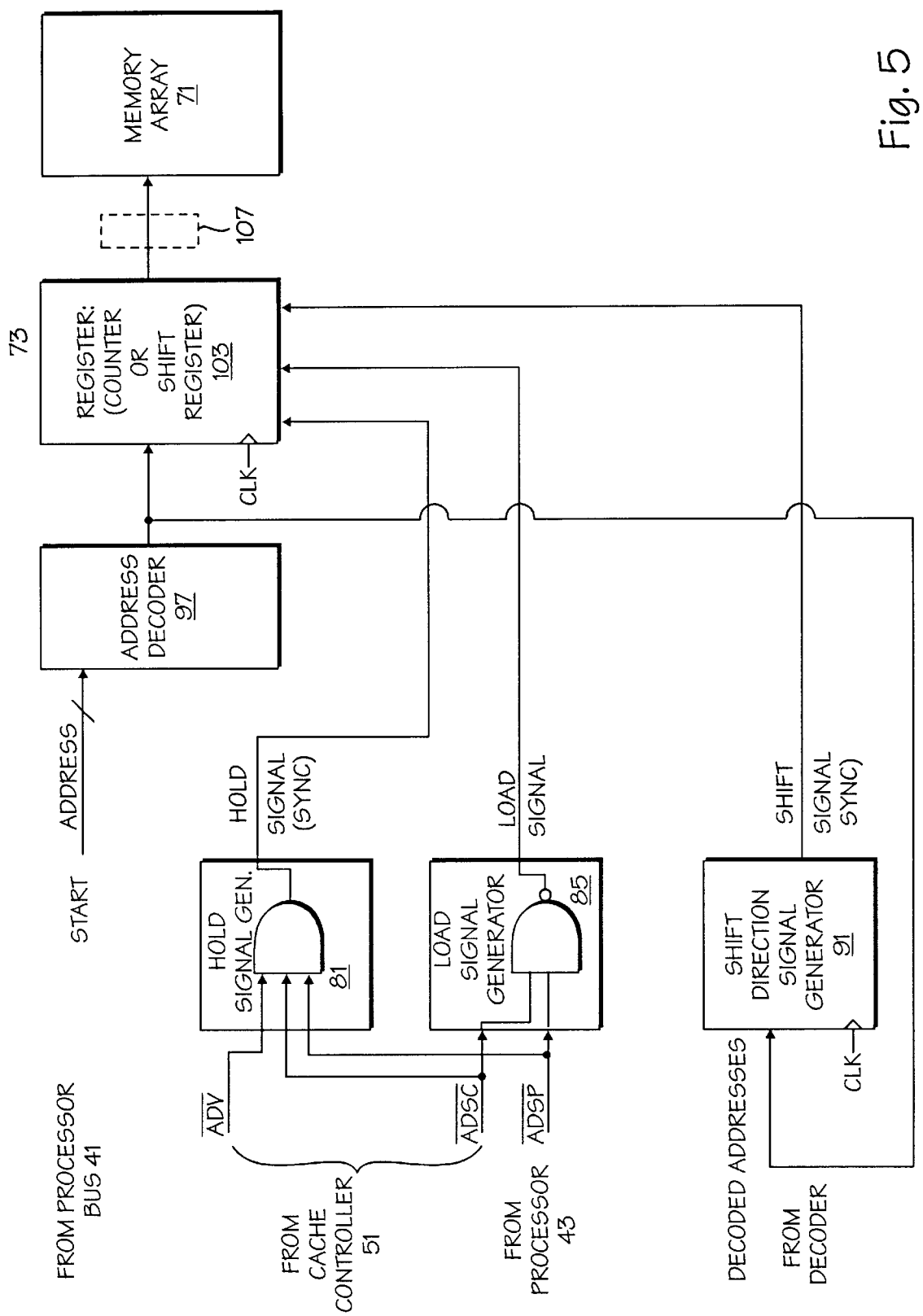
FIG. 5 illustrates a block diagram of the burst address generator of the present invention.

FIG. 5 illustrates in greater detail the burst address generator 73 of the present invention. The burst address generator 73 includes a hold signal generator 81. The hold signal generator 81 has a first input port for receiving the $\overline{\text{ADV}}$ signal, a second input port for receiving $\overline{\text{ADSC}}$ and a third input port for receiving the $\overline{\text{ADSP}}$ signal. The hold signal generator 81 may be implemented as a three input AND gate having a first input for receiving the $\overline{\text{ADV}}$ signal, a second input for receiving the $\overline{\text{ADSC}}$ signal, and a third input for receiving the $\overline{\text{ADSP}}$ signal. The output of this AND gate is the hold signal. The burst address generator 73 includes the load signal generator 85. The load signal generator has a first input port for receiving the $\overline{\text{ADSC}}$ signal and a second input port for receiving the $\overline{\text{ADSP}}$ signal. The load signal generator in response to these two signals, generates a load signal.

The load signal generator 85 may be implemented as a NAND gate having a first input for receiving the $\overline{\text{ADSC}}$ signal, and a second input for receiving the $\overline{\text{ADSP}}$ signal. The output of this NAND gate would be the load signal.

Burst address generator 73 further includes a shift direction signal generator 91 and a start address storage unit 95. The shift direction signal generator 91 has a plurality of input ports for receiving a decoded address from the decoder 97 and generates a synchronous shift signal. The start address storage 95 includes a plurality of input ports for receiving the decoded address from the address decoder 97 and for storing the start address.

The burst address generator 73 further includes a register 103. This register 103 may be implemented using a counter or a shift register. The register 103 will be described in further detail with reference to FIGS. 6 and 7.

The register 103 is coupled to the address decoder 97, the hold signal generator 81, the load signal generator 85 and the shift direction signal generator 91. Specifically, the register 103 receives the decoded address from the address decoder 97, as well as the hold signal, the load signal, and the shift signal from the respective signal generators.

The register 103, in response to these various above-noted signals, generates a single logical high output signal that may be used in further decoder stages 107, or by a column or row decoder, disposed in the memory array 71.

The address decoder 97 has a plurality of inputs for receiving a start address from the processor bus 41 and a plurality of output ports for generating a decoded address (i.e., one of the output ports is asserted). The decoded address, as previously mentioned, is provided to the register 103 and the shift direction signal generator 91. It will be recognized that the present invention specifically places the address decoder 97 before the register 103, whereas in the prior art burst counters, the address decoder is placed after the register 103. This placement of the address decoder 97 prior to the register 103 takes the address decoder 97 out of the "speed path". By so doing, the present invention ensures that the propagation delay through the address decoder 97 no longer contributes to the $T_{cdv}$ of the register 103. Instead, the present invention utilizes the set-up time for the register 103 to decode the start address. Thus, the burst address generator 73 of the present invention employs a register 103 that manipulates a decoded address. The register 103 may be implemented as a counter or a shift register. The register 103, as implemented with a shift register, will be described in greater detail hereinafter.

Figure 6:
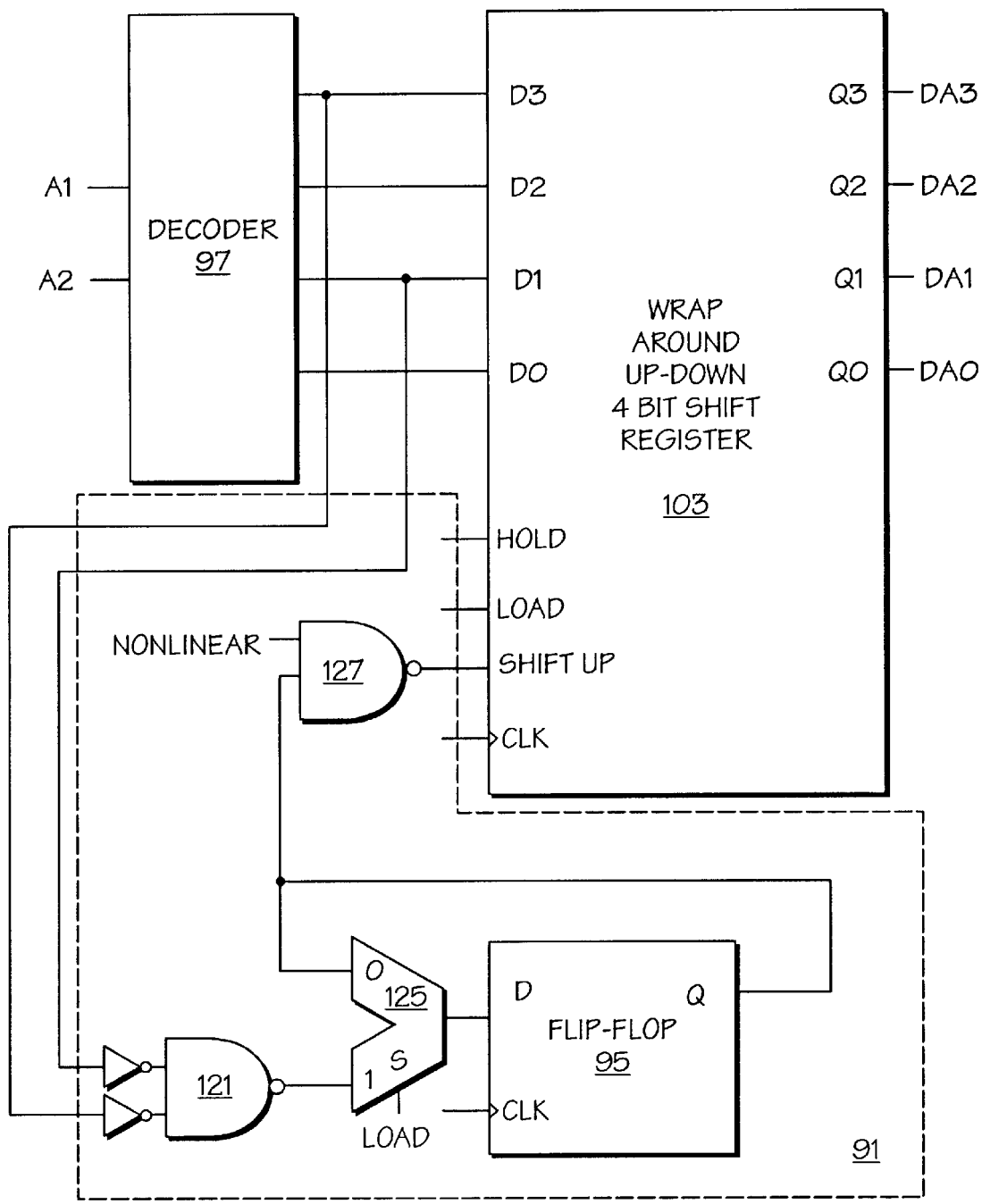
FIG. 6 illustrates in greater detail the shift direction signal generator and the start address storage circuit of the present invention, as illustrated in FIG. 5.

FIG. 6 illustrates in greater detail the shift direction generator 91 of the present invention, as illustrated in FIG. 5. The shift direction generator 91 includes a start address storage unit 95. The shift direction signal generator 91 further includes a first NAND gate 121 that has a first input for receiving the inversion of decoded address bit (D1) and a second input for receiving the inversion of decoded address bit (D3). The output of the first NAND gate 121 is coupled to a multiplexer 125. The multiplexer 125 is coupled to the start address storage 95. In this embodiment, the start address storage 95 is a register, which may be implemented by a D Flip-Flop.

The multiplexer 125 in response to the load signal selectively provides either the output of the first NAND gate 121 or the output of the D Flip-Flop 95 as the output of the multiplexer 125. Specifically, the multiplexer 125 is used by the present invention to either:

1) load selective bits from the output of the decoder 97, which are used to determine the shift direction (i.e., up or down) for the shift register 103 in a non-linear mode, or;

2) re-load the contents of the register 95 (i.e., refresh the contents of the D Flip-Flop 95). The D Flip-Flop 95 is initially loaded with important bits of the decoded address and thereafter during the burst sequence stores that value.

The shift direction signal generator 91 also includes a second NAND gate 127 that includes a first input for receiving a non-linear signal and a second input for receiving the output of the D Flip-Flop. The second NAND gate 127 generates the shift signal. The second NAND gate 127 is used by the present invention to ensure the proper operation of the wrap around up-down 4-bit shift register 103. In the linear mode, the second NAND gate 127 always generates a shift-up signal to the shift register 103. In other words, if the non-linear signal is not asserted (i.e., a linear burst sequence is desired), the second NAND gate 127 always instructs the shift register 103 to shift-up. When the non-linear signal is asserted (i.e., a non-linear burst sequence is desired), the shift direction (i.e., a shift-up or shift-down) depends on the contents of the D Flip-Flop 95. If the initial start address is 00 or 10, then the second NAND gate 127 instructs the shift register 103 to shift-up. If the start address is 01 or 11, the second NAND gate 127 instructs the shift register 103 to shift-down.

Figure 7:
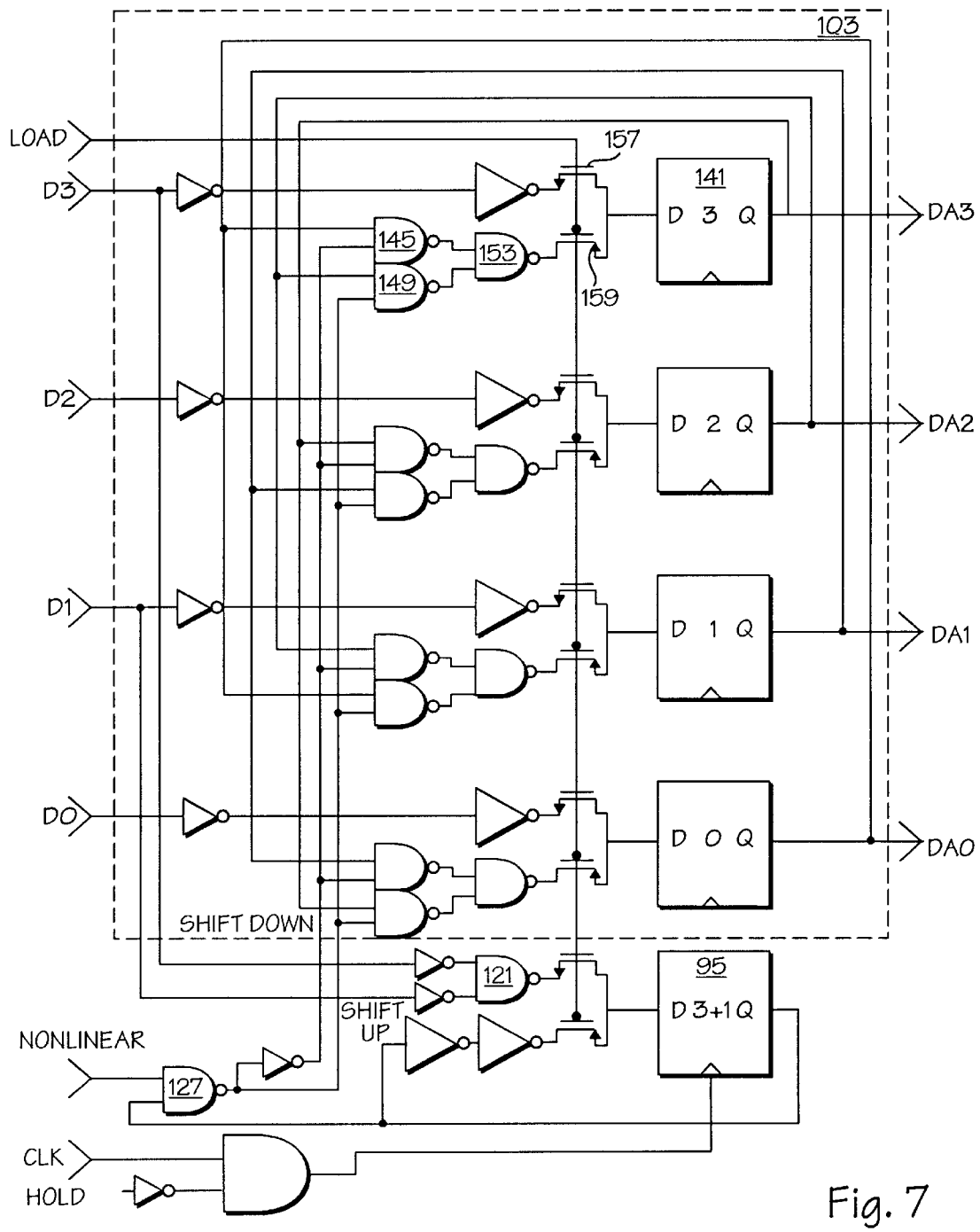
FIG. 7 illustrates in greater detail the shift register of the present invention, as illustrated in FIG. 6.

FIG. 7 illustrates in greater detail the shift register 103 as illustrated in FIG. 6. The shift register 103 includes the following inputs. First, shift register 103 includes a plurality of input ports for receiving the decoded address (D[3:0]). Second, the shift register 103 includes an input port for receiving a load signal. Third, the shift register 103 includes an input port for receiving a hold signal. Fourth, the shift register 103 includes an input port for receiving a clock signal (e.g., a system clock). In this embodiment, the clock port receives a signal from an AND gate, which gates the CLK signal with an inverted hold signal. Last, the shift register 103 includes an input port for receiving the output of the second NAND gate 127. This signal indicates the shift direction to the shift register 103 (i.e., whether to shift-up or to shift-down). The sources of the hold, load, and shift signals have been described previously.

The shift register 103 also includes a plurality of output ports for generating the DA[3:0] signals. It is noted that one of the DA[3:0] signals is asserted every clock cycle.

The shift register 103 includes a plurality of registers that may be implemented with D Flip-Flops 141, Each output register stores a bit of information corresponding to the respective output signal (DA[3:0]).

The output register is either loaded with a respective bit of the decoded address (i.e., one of D[3:0]) or the bit of information residing in the output register directly preceding or succeeding the present output register 141. For example, output register D3 is loaded either with D3 or the contents of output register D2 or D0 depending on the shift direction. Whereas the load signal determines whether or not signal D3 or the contents of either register D2 or D0 is provided to register D3, the shift-up signal generated by the second NAND gate 127 and its complement (i.e., the shift-down signal) determines whether the contents of the preceding output register (D2) or the succeeding output register (D0) is provided to register D3.

Specifically, each output register has an associated first NAND gate 145 that includes a first input for receiving a shift-down signal and a second input for receiving the output of the next register (i.e., D0). A second NAND gate that has a first input for receiving the shift-up signal and a second input for receiving the output of the previous register (i.e., D2) is also provided. The first NAND gate 145 and the second NAND gate 149 are coupled to a third NAND gate 153.

The third NAND gate 153 has a first input for receiving the output of the first NAND gate 145 and a second input for receiving the output NAND gate 149. The third NAND gate 153 provides to output register DA3 either the information stored in register DA0 or the information stored in register DA2. The output of third NAND gate 153 is provided to the output register DA3 via the pass transistor 159. Similarly, the input D3 of the shift register 103 is provided to output register DA3 via an inverter and a second pass gate 157. Both pass gates 157 and 159 are controlled by the load signal. As is evident for FIG. 7, the first NAND gate 145, the second NAND gate 149, the third NAND gate 153, the inverter, and the first and second pass gates 157 and 159 are mirrored for each respective output register.

Attachment A includes detailed circuit diagrams of the preferred embodiment of the present invention. This attachment will be understood to those skilled in the art to include specific implementation details used by the assignee of the present application to make and use the present invention.

Figure 8:
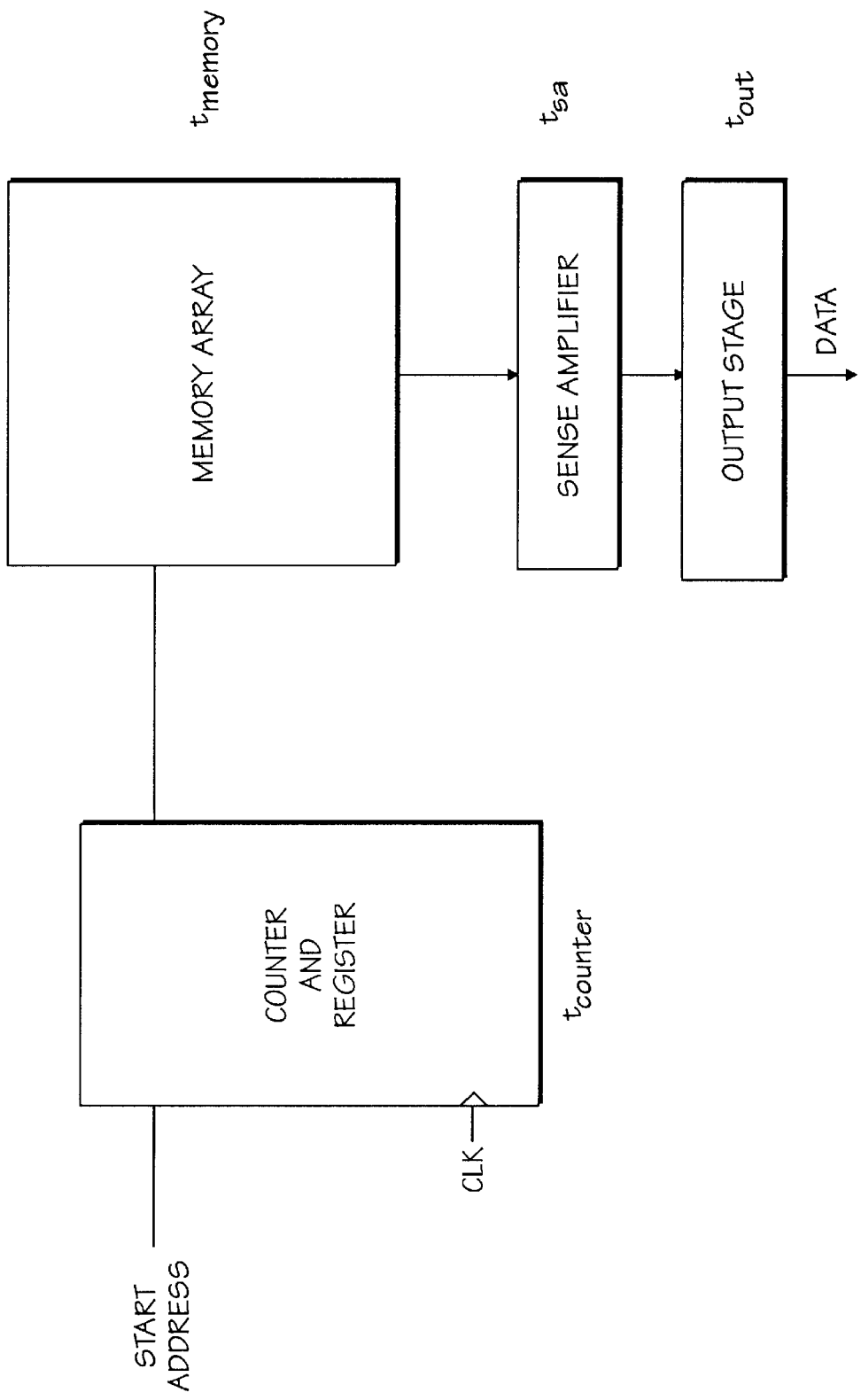
FIG. 8 illustrates the general block diagram of the architecture for the burst address generator of the present invention.

FIG. 8 illustrates the general block diagram of the architecture of the burst address generator of the present invention. As is evident, the present invention removes the decoder from the speedpath. Accordingly, $T_{cdv}$ is equal to $T_{counter}+T_{memory}+T_{sa}+T_{out}$. Thus, the present invention decreases $T_{cdv}$ by taking the decoder out of the speedpath (i.e., making $T_{decoder}=0$). Decoding the addresses during the setup time of the shift register improves the overall performance of the computer system.

In the foregoing specification, the invention has been described with reference to specific exemplary embodiments thereof. It will however be evident that various modifications and changes may be made thereto without departing from the broader spirit and scope of the invention as set forth in the appended claims. The specification and drawings are accordingly to be regarded as illustrative rather than restrictive.

What is claimed is:

1. A burst counter coupled to a memory array having a first predetermined mode of operation and a second predetermined mode of operation, said burst counter having a plurality of inputs for receiving a start address having N-bits and for dynamically generating $2^N$ addresses, wherein the $2^N$ addresses include the start address and $2^N-1$ subsequent addresses, said burst counter comprising:
    a) an address decoder receiving and decoding the start address into a decoded start address; and
    b) a storage element coupled to the address decoder, said storage element having a first input receiving the decoded start address and a second input receiving a mode-select input signal, said storage element responsive to the decoded start address and the mode-select input signal, and dynamically generating $2^N$ addresses in accordance with: (i) the first predetermined mode of operation based on a first state of the mode-select input signal, and (ii) the second predetermined mode of operation based on a second state of the mode-select input signal.

2. The burst counter, as claimed in claim 1, wherein the storage element is a $2^N$-bit up-down, wrap around shift register.

3. The burst counter, as claimed in claim 2, wherein the shift register includes a plurality of D flip-flops, wherein each flip-flop is coupled respectively to at least a row or column in the memory array; wherein each flip-flop has its input coupled to at least the respective decoded address bit from the address decoder and the output of a selected one of the other flip-flops, wherein the selection of input is based upon a load signal and the mode-select signal.

4. The burst counter, as claimed in claim 2, further comprising a load signal generator circuit, said load signal generator circuit having an input for receiving an address strobe cache controller signal indicating that an address from a cache is to be loaded into the shift register, and a second input for receiving an address strobe processor signal, indicating that an address from a processor is to be loaded into the shift register, said load signal generator generating a load signal based upon the address strobe cache controller signal and the address strobe processor signal.

5. The burst counter as claimed in claim 4 wherein the load signal generator circuit is a NAND gate.

6. The burst counter, as claimed in claim 1, further comprising a start address storage element coupled to the decoder for storing the start address.

7. The burst counter as claimed in claim 6, wherein the storage element and the start address storage element each have a clock input for receiving a clock signal.

8. The burst counter, as claimed in claim 1, wherein the storage element includes a hold input for receiving an advance signal corresponding to another start address.

9. The burst counter as claimed in claim 1 wherein the first predetermined mode of operation is linear mode and the second predetermined mode of operation is a non-linear mode.

10. The burst counter as claimed in claim 1 wherein N=2 and the burst counter is adapted to generate four addresses in a burst sequence.

11. A computer system having a processor, a cache controller coupled to said processor controlling a cache memory, said cache memory including a burst counter having a first and second mode of operation, said cache memory coupled to the processor and the cache controller, said cache memory further including a memory array coupled to the burst counter, wherein the burst counter comprises:
    a) an address decoder receiving a start address and decoding the start address into a decoded address; and
    b) a storage element coupled to the address decoder and having a plurality of inputs receiving the decoded address, said storage element dynamically generating $2^N$ addresses in accordance with (i) a first predetermined mode of operation and a first state of a mode-select input signal, and (ii) a second predetermined mode of operation and a second state of the mode-select signal.

12. The computer system, as claimed in claim 11, wherein the storage element is a $2^N$-bit up-down, wrap around shift register.

13. The computer system, as claimed in claim 12, wherein the shift register includes a plurality of D flip-flops, wherein each flip-flop is coupled respectively to at least a row or column in the memory array; wherein each flip-flop has its input coupled to at least the respective decoded address bit from the address decoder and the output of a selected one of the other flip-flops, wherein the selection of input is based upon a load signal and the mode-select signal.

14. The computer system, as claimed in claim 12, further comprising a load signal generator circuit, said load signal generator having an input for receiving an address strobe cache controller signal indicative that an address from a cache is to be loaded into the shift register, and a second input for receiving an address strobe processor signal, indicative that an address from the processor is to be loaded into the shift register, said load signal generator generating a load signal based upon the address strobe cache controller signal and the address strobe processor signal.

15. The computer system, as claimed in claim 14, wherein the load signal generator is a NAND gate.

16. The computer system, as claimed in claim 11, further comprising a start address storage element coupled to the address decoder for storing the start address.

17. The computer system, as claimed in claim 16, wherein the storage element and the start address storage element each have a clock input for receiving a clock signal from the computer system.

18. The computer system, as claimed in claim 11, wherein the storage element includes a hold input for receiving an advance signal indicative that the computer system is ready for a next address.

19. The computer system, as claimed in claim 11, wherein the first mode of operation is a linear mode and the second mode of operation is a non-linear mode.

20. The computer system, as claimed in claim 11, wherein N=2 and the burst counter is adapted to generate four addresses in a burst sequence.

21. In a circuit comprising a burst counter having a first and a second predetermined mode of operation, a method of operating the burst counter comprising the steps of:

decoding an N-bit start address;

loading the decoded start address into a storage element; and generating one of $2^N$ addresses in response to the first or second predetermined mode of operation.

* * * * *